(12) United States Patent
Hishitani et al.

(10) Patent No.: US 7,338,729 B2
(45) Date of Patent: Mar. 4, 2008

(54) FUEL CELL COLLECTOR STRUCTURE AND SOLID OXIDE FUEL CELL STACK USING THE SAME

(75) Inventors: Yoshiko Hishitani, Yokohama (JP); Itaru Shibata, Kamakura (JP); Fuminori Satou, Yokohama (JP); Keiko Kushibiki, Fujisawa (JP); Yasushi Nakajima, Kawasaki (JP); Shigeo Ibuka, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 577 days.

(21) Appl. No.: 10/893,355

(22) Filed: Jul. 19, 2004

(65) Prior Publication Data
US 2005/0019642 A1 Jan. 27, 2005

(30) Foreign Application Priority Data
Jul. 24, 2003 (JP) ............................. 2003-200833
Dec. 17, 2003 (JP) ............................. 2003-419676

(51) Int. Cl.
*H01M 2/00* (2006.01)
(52) U.S. Cl. ......................................... 429/34; 429/38
(58) Field of Classification Search .................. 429/12, 429/30, 34, 35, 36, 38, 39, 32, 33
See application file for complete search history.

(56) References Cited

U.S. PATENT DOCUMENTS

| 6,007,933 | A | 12/1999 | Jones | |
|---|---|---|---|---|
| 2004/0101733 | A1* | 5/2004 | Yamanis et al. | 429/34 |
| 2004/0185326 | A1 | 9/2004 | Wetzel et al. | |

FOREIGN PATENT DOCUMENTS

| DE | 40 16 157 A1 | 12/1990 |
|---|---|---|
| EP | 0 432 381 A1 | 6/1991 |
| JP | 1-12469 A | 1/1989 |
| JP | 6-203857 A | 7/1994 |
| JP | 2001-68132 A | 3/2001 |
| WO | WO 02/101859 A2 | 12/2002 |

\* cited by examiner

*Primary Examiner*—Patrick Joseph Ryan
*Assistant Examiner*—Monique Wills
(74) *Attorney, Agent, or Firm*—Foley & Lardner LLP

(57) ABSTRACT

A fuel cell collector structure of the present invention includes a single cell which is formed by sandwiching a plate-shaped solid electrolyte between a fuel electrode and an air electrode, a collector which is provided at a position adjacent to the single cell, and a separator which is provided at the position adjacent to the collector. In the fuel cell collector structure, the collector is made of a porous electric conductor having a plurality of apertures on a surface, the single cell and/or the separator has a plurality of electrically conductive projections on the surface, and the projections intrude into the apertures to come into contact with the collector.

13 Claims, 12 Drawing Sheets

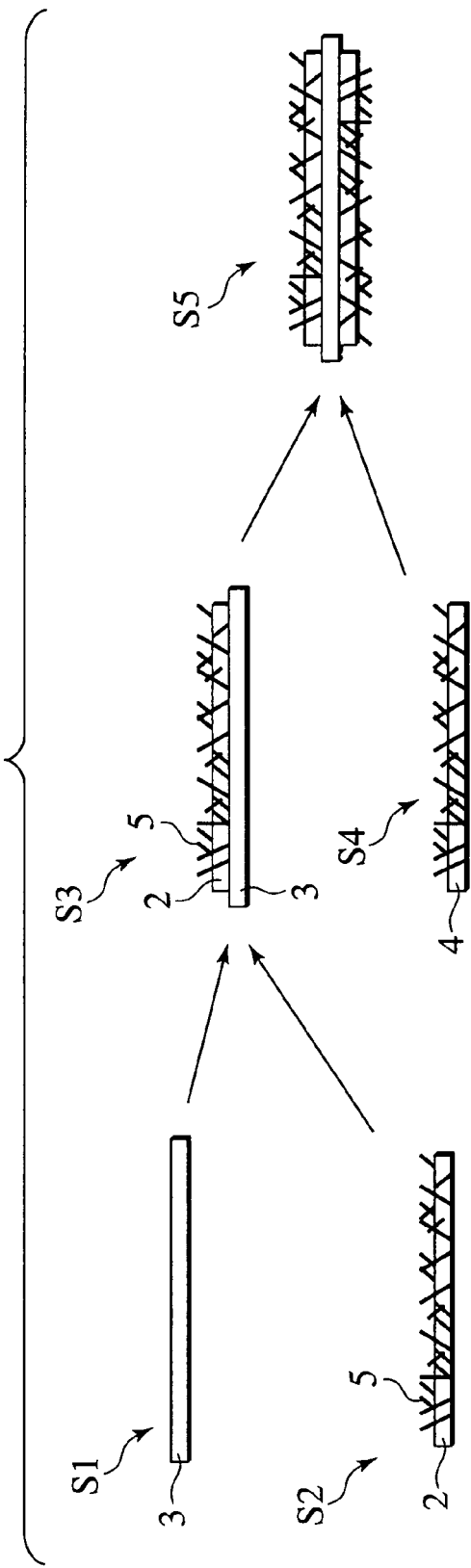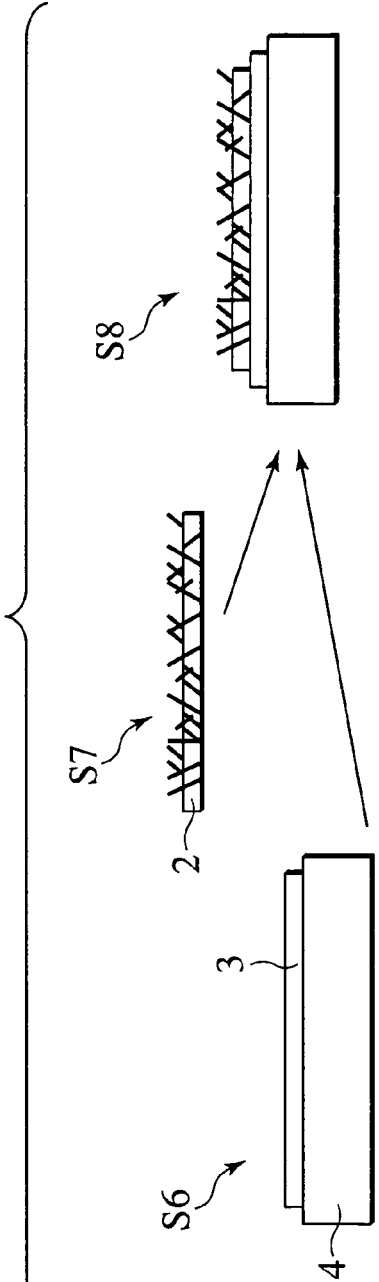

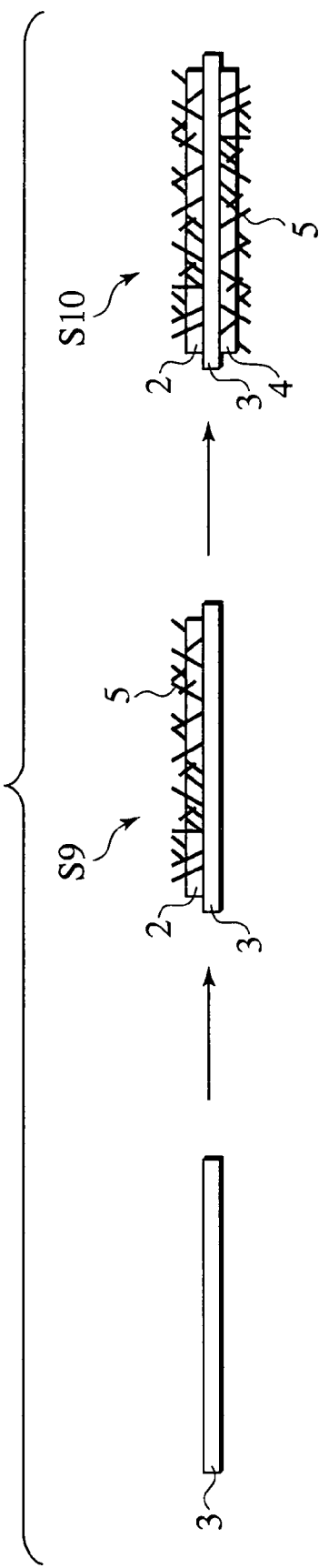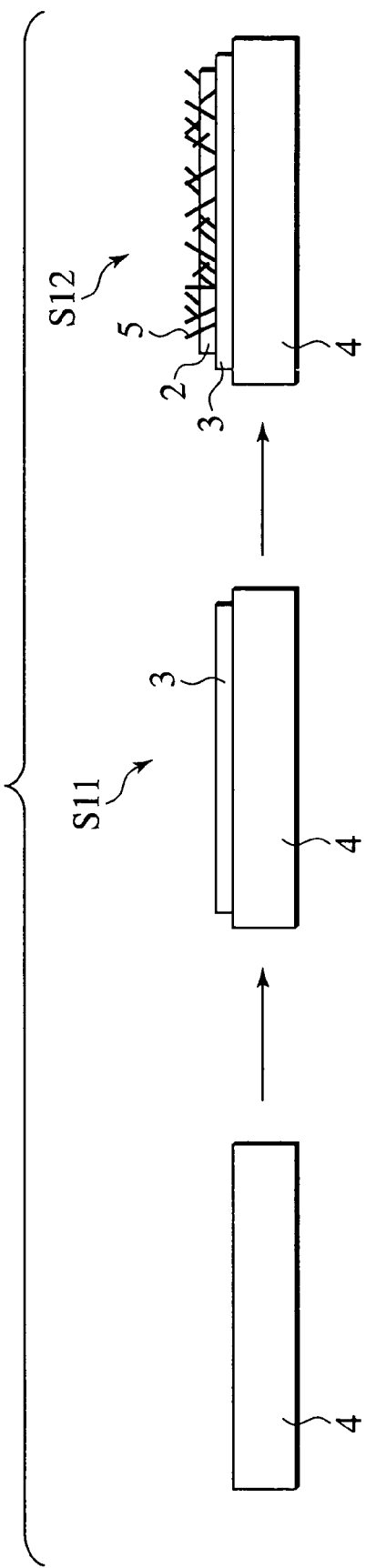

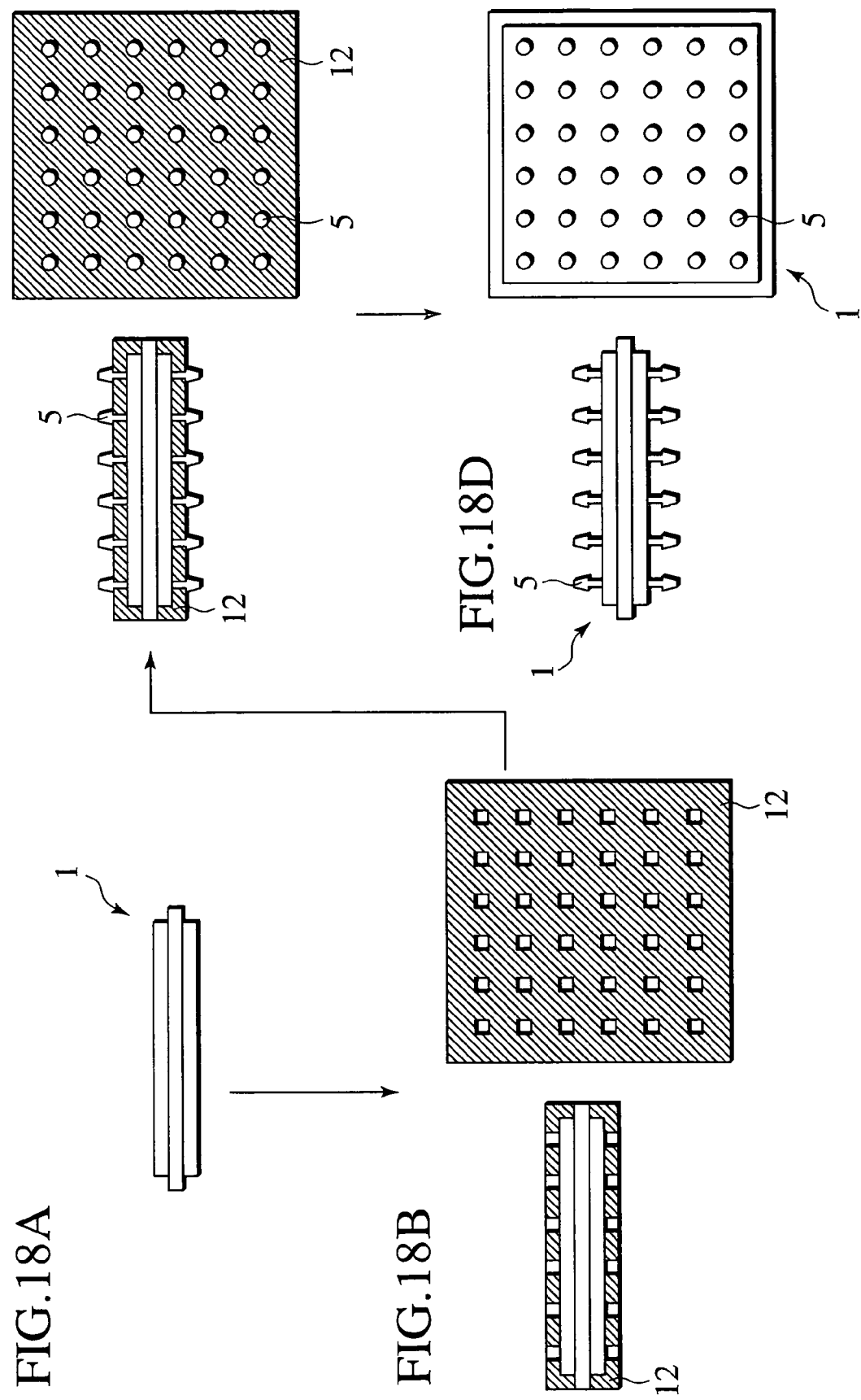

FUEL CELL COLLECTOR STRUCTURE AND SOLID OXIDE FUEL CELL STACK USING THE SAME

BACKGROUND OF THE INVENTION

1. Field of the Invention

The present invention relates to a fuel cell collector structure and a solid oxide fuel cell stack using the same. More particularly, the invention relates to the fuel cell collector structure which secures electric conduction between plate-shaped single cells and prevents a decrease in conductivity characteristics of a single cell by deformation caused by temperature change, and also relates to the solid oxide fuel cell stack using the same.

2. Description of the Related Art

Recently, the fuel cell receives attention from a viewpoint of resource saving and environmental protection. In the fuel cell, air and hydrogen are respectively used as oxidizing agent gas and fuel gas to directly convert latent chemical energy of the fuel into electric energy. Particularly, because a solid oxide fuel cell (SOFC) has many advantages such that electric power generation efficiency is high and waste heat is effectively utilized, researches and developments of SOFC are actively performed.

SOFC includes the single cell in which an air electrode made of $(La, Sr)MnO_3$ and a fuel electrode made of NiO-yttria stabilized zirconia cermet are respectively arranged on the surfaces of a solid electrolyte layer made of yttria stabilized zirconia (YSZ), and a separator which electrically connects adjacent single cells and distributes the fuel gas and the oxidizing agent gas to the single cell.

A collector surface of the separator has conventionally been formed in a plane by machining. However, the single cell has curling or deformation generated in forming the single cell, and it is difficult to correct the deformation to the complete plane by the machining due to a material of the single cell or the like. Therefore, when the separator is attached to the single cell, the single cell does not come into contact with the whole of the collector surface of the separator, but the single cell comes into point contact with the collector surface, so that in some cases, a good electrical connection state cannot be obtained.

When a plurality of single cells are laminated, it is necessary to clamp the laminated single cells from above and below the single cell in order to stable the single cell, and clamping load is applied to the single cell through the separator. When clamping force is changed by the temperature fluctuation and the load becomes excessive, sometimes the separator or the single cell is broken.

In order to solve the above problems, there has been proposed the fuel cell collector structure in which a metal plate having a concave portion elastically comes into contact with an air electrode and a fuel electrode to release stress applied to the cell at the time of the current collection (see Japanese Patent Application Laid-Open No. 2001-68132). There has also been proposed a method of using electrically conductive felt as the collector (see Japanese Patent Application Laid-Open No. H1-012469). Further, it has been proposed that the electrically conductive felt is arranged while pressed by elastic contact (see Japanese Patent Application Laid-Open No. H6-203857).

SUMMARY OF THE INVENTION

However, in the technique described in Japanese Patent Application Laid-Open No. 2001-68132, because a countermeasure of thickening the cell and the like are required in order to secure strength of the cell so as not to break the cell, the stack becomes heavy and large. This does not satisfy the lightness and the compactness, which are requirements of a vehicle.

In the technique described in Japanese Patent Application Laid-Open No. H1-012469, densification proceeds by heat of the electrically conductive felt during use, and contact failure is generated by a decrease in cushioning characteristics and deformation of the electrically conductive felt. When the technique described in the publication is applied to a vehicle, since vibration and impact are intensive, the decrease in cushioning characteristics and the deformation of the electrically conductive felt are easy to further proceed.

The technique described in Japanese Patent Application Laid-Open No. H6-203857 is a method in which an elastic body is inserted to press the electrically conductive felt. However, the elastic body which can stably maintain the elasticity under temperature environment of SOFC is extremely expensive, and the stack becomes large and heavy.

The present invention has been achieved in view of the above problems in the conventional technique, and it is an object of the present invention to provide a fuel cell collector structure having a good electrical continuity, which can prevent the electrical contact failure among the single cell, the collector, and the separator caused by the densification or shift of the collector, and the solid oxide fuel cell stack using the same.

The first aspect of the present invention provides a fuel cell collector structure comprising: a single cell which is formed by sandwiching a plate-shaped solid electrolyte between a fuel electrode and an air electrode; a collector which is provided at a position adjacent to the single cell; and a separator which is provided at the position adjacent to the collector, wherein the collector is made of a porous electric conductor having a plurality of apertures on a surface, the single cell and/or the separator has a plurality of electrically conductive projections on the surface, and the projections intrude into the apertures to come into contact with the collector.

The second aspect of the present invention provides a solid oxide fuel cell stack comprising: a fuel cell collector structure including a single cell which is formed by sandwiching a plate-shaped solid electrolyte between a fuel electrode and an air electrode, a collector which is provided at a position adjacent to the single cell, and a separator which is provided at the position adjacent to the collector, wherein the collector is made of a porous electric conductor having a plurality of apertures on a surface, the single cell and/or the separator has a plurality of electrically conductive projections on the surface, and the projections intrude into the apertures to come into contact with the collector.

BRIEF DESCRIPTION OF THE DRAWINGS

The invention will now be described with reference to the accompanying drawings wherein;

FIG. 10 is a schematic view showing a process of producing the single cell in the first example;

FIG. 11 is a schematic view showing another process of producing the single cell in the first example;

FIG. 14 is a schematic view showing an example of the process of producing the single cell;

FIG. 15 is a schematic view showing another example of the process of producing the single cell;

FIGS. 18A, 18B, 18C, and 18D are views for explaining a process of producing a single cell in the third example;

DETAILED DESCRIPTION OF THE PREFERRED EMBODIMENTS

Hereinafter, description will be made of embodiments of the present invention with reference to the drawings.

Figure 1:
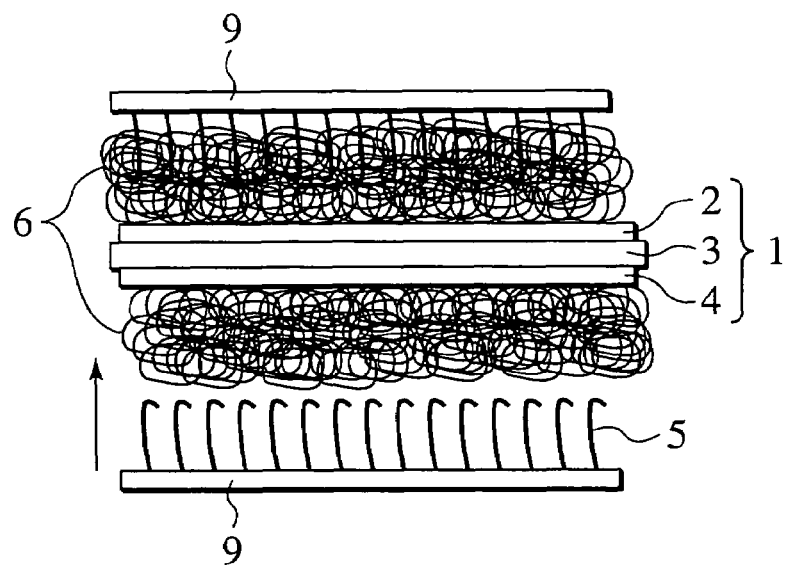
FIG. 1 is a schematic view showing a fuel cell collector structure of the invention.
Figure 9A:
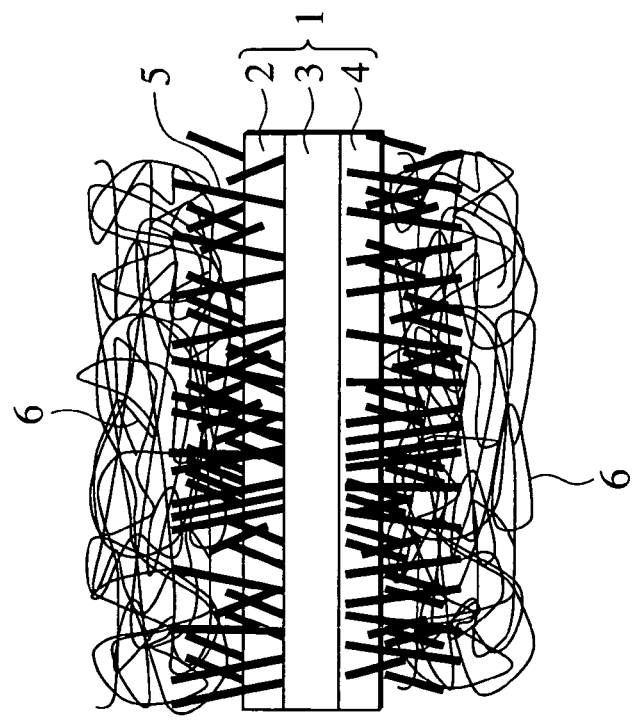
FIG. 9A is a schematic view showing a single cell and the collector in a first example.

The fuel cell collector structure of the present invention is adapted for the solid oxide fuel cell in which the collector and the separator are laminated on the single cell formed by sandwiching a plate-shaped solid electrolyte between a fuel electrode and an air electrode. Specifically, as shown in FIG. 1, the collector structure of the invention uses a collector 6 made of a porous electric conductor having a plurality of apertures on its surface. As shown in FIGS. 1 and 9A, in the collector structure of the invention, a plurality of electrically conductive projections 5 are provided on the surface of one of or both of a separator 9 and a single cell 1 formed by sandwiching a plate-shaped solid electrolyte layer 3 between an air electrode layer 2 and a fuel electrode layer 4. The single cell, the collector, and the separator are arranged so that the projections 5 intrude into the apertures of the collector 6 to come into contact with the collector 6.

The electric conductivity between the porous electric conductor and the electrically conductive projection is improved by causing the porous electric conductor to come into contact with the surface of the projection in the above-described manner. Compared with the method of strongly pressing the collector made of the conventional metal thin plate or electrically conductive felt against the single cell, a stress load applied to the single cell is reduced. The single cell can be thinly and lightly designed, so that weight saving and miniaturization of the stack can be achieved. Even if the single cell and the collector are shifted from each other by deformation of a stack constituting component such as the single cell and the separator or densification and the deformation of the porous electric conductor, the electrical continuity is maintained because the electrically conductive projection is three-dimensionally in contact with the collector. Electrical resistance of the electrode is decreased and output of the cell is improved, because the electrically conductive projection made of an electric conductive material is embedded in the electrode layer of the single cell.

In this case, it is desirable that the single cell or the separator having the electrically conductive projection and the porous electric conductor are fixed so as not to be moved in a plane direction. Specifically, it is desirable that a sectional average diameter of the projections is smaller than the average diameter of the apertures. Therefore, operating life of the electrical contact between the collector and the single cell can be extended because the leading end of the projection intrudes into a concave portion of the porous electric conductor and becomes a stopper to be fixed to each other. Typically, it is desirable that the average diameter of the projections ranges from 0.1 μm to 1 mm and the average diameter of the apertures ranges from 1 μm to 1 mm.

Figure 2A:
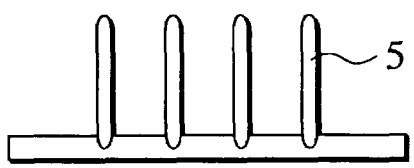
FIGS. 2A, 2B, and 2C are schematic views showing projections in the fuel cell collector structure of the invention.
Figure 3A:
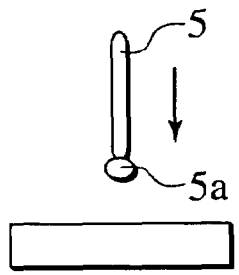
FIGS. 3A and 3B are schematic views for explaining a method of manufacturing the projection.

It is preferable that the electrically conductive projection has the structure which is easy to intrude into the concave portion of the porous electric conductor. For example, the projection is formed in a needle-shaped or columnar structure as shown in FIG. 2A. In order to form the electrically conductive projection 5 in the needle-shaped or columnar structure, the method of thrusting the projection 5 into a metal plate, the method of carving the surface to form a grater, or the etching method can be cited. As shown in FIG. 3A, the method of forming a joint portion 5a of the projection 5 in a sphere or a hemisphere to perform joining by plastic deformation can be also cited. Therefore, contact efficiency between the electrically conductive projection and the porous electric conductor is increased and the contact resistance can be further improved.

Figure 2B:
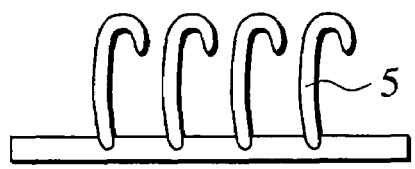
Figure 3B:
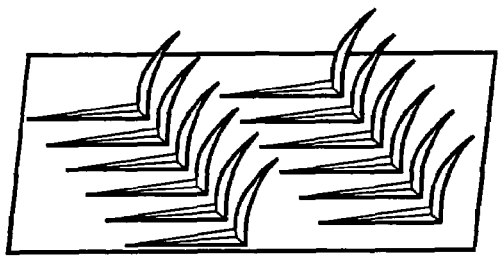

As shown in FIG. 2B, the leading end of the electrically conductive projection 5 can be curved in a hook shape. In this case, the leading end portion can come into better contact with the porous electric conductor to decrease the contact resistance, compared with the needle-shaped or columnar structure. Further, since the leading end portion of the projection 5 is hooked in the concave portion of the porous electric conductor, the porous electric conductor and the separator are fixed to each other. In order to form the leading end portion of the projection 5 in the hook shape, for example, if the grater structure is formed as shown in FIG. 3B, the leading end portion of the projection becomes the hook shape. The grater structure can be formed by carving the surface in a wedge shape by cutting operation.

Figure 2C:
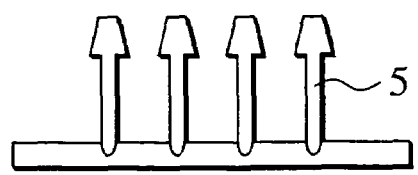

As shown in FIG. 2C, in the electrically conductive projection 5, the leading end portion can be formed thicker than the portion which is adjacent to the separator or the electrode layer. In this case, the structure is effective because the electrically conductive projection is difficult to disengage from the porous electric conductor.

As described above, in the collector structure of the invention, it is preferable that the electrically conductive projection has at least one inflection point. By doing so, contact density inside the aperture of the porous electric conductor is easily improved and the collector structure becomes easier to tangle in the porous electric conductor.

When the electrically conductive projection is provided in the separator, it is preferable that the projection and the separator are made of the same metal or the metals or alloys which are soluble in each other. By doing so, the working becomes easy when the projection is provided on the separator.

Typically, the electrically conductive projection can be formed by embedding the electrically conductive projection material such as metal fiber and metal filler in the single cell or the separator. Further, the electrically conductive projection can be formed by simultaneously baking the electrically conductive projection material and the electrode material, or by electrolytic plating. Metals such as nickel (Ni), tungsten (W), chromium (Cr), aluminum (Al), molybdenum (Mo), tantalum (Ta), and vanadium (V) or heat-resistant alloys including these metals, noble metals such as platinum (Pt) and palladium (Pd) or the alloys including the noble metals, or the material in which the above-described heat-resistant alloys are coated with the noble metals can be used as the component material of the projection. These materials are effective for the projection for which the electric conductivity is required, because these materials are difficult to form an oxide film on the surface in a high-temperature oxidation atmosphere or these materials form an electrically conductive oxide film in the high-temperature oxidation atmosphere.

Figure 4A:
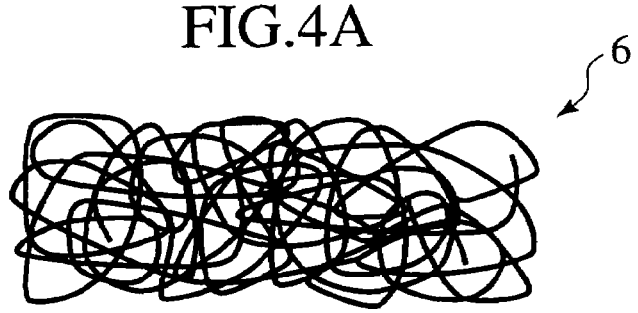
FIGS. 4A, 4B, and 4C are schematic views showing a collector in the fuel cell collector structure of the invention.

The material formed by a metal thin wire can be used as the porous electric conductor as shown in FIG. 4A. In this case, the single cell and the separator can come into contact with each other without damaging each other. The material in which the metal thin wires having elasticity intricately intertangle with one another can be used for the material formed by the metal thin wire. Specifically the so-called metal felt formed by the metal thin wire having the diameter not more than 100 μm can be used. It is desirable that the porous electric conductor is made of the material including many gaps and having light specific gravity.

Figure 4B:
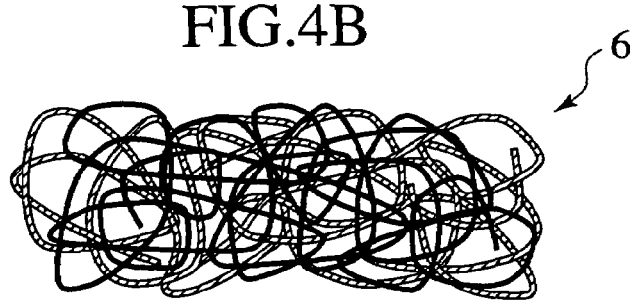

The material formed by performing mix spinning of the plurality of metal thin wires made of different materials can be also used as the porous electric conductor as shown in FIG. 4B. The proper combination and the mix spinning of the metal thin wires made of the plurality of kinds of the metals or alloys can prevent the metal thin wire from reducing porosity by solution or compression. The porous electric conductor material in which the diameter of the metal thin wire is formed not more than 100 μm, the metal thin wires are caused to intricately intertangle with one another to perform the uniform mix spinning of the plurality of materials, and porosity is set to the range of 20 to 98% can be used as the metal thin wires made of the plurality of kinds of the metals or alloys.

Figure 4C:
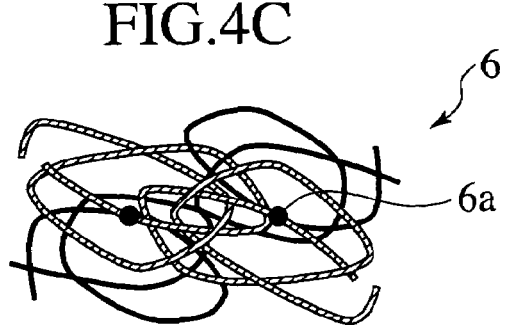

As shown in FIG. 4C, the material in which the metal thin wires made of the different materials join with one another can be used as the porous electric conductor. In this case, the metal thin wires are difficult to spread out by the proper combination and the joining of the metal thin wires made of the plurality of kinds of the metals or alloys. The porous electric conductor can be prevented from thinning by ravel by joining the metal thin wires made of the plurality of kinds of the metals or alloys to one another. The numeral 6a designates a joint portion of the metal thin wires in FIG. 4C.

Figure 5:
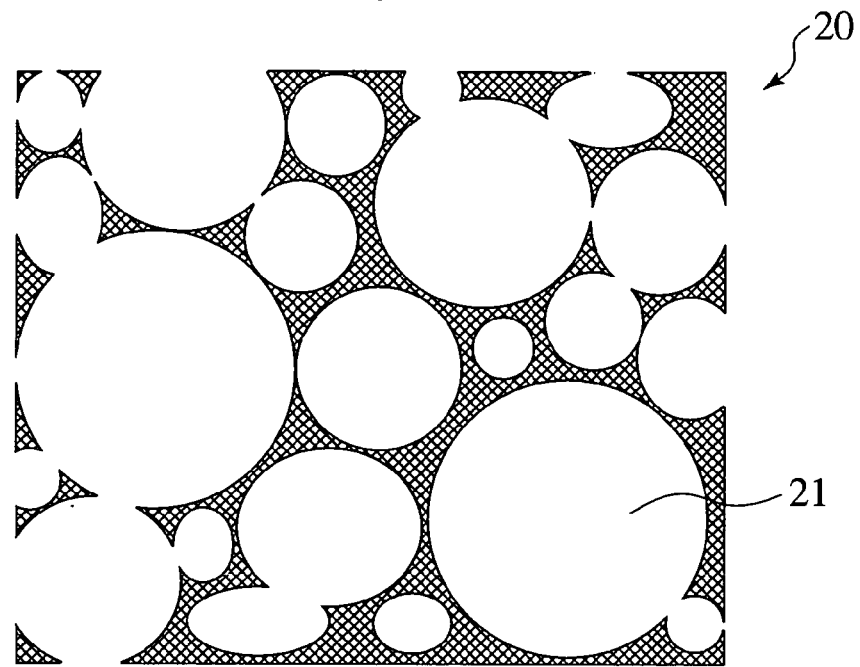
FIG. 5 is an enlarged view showing a foam metal used as a porous electric conductor.

As shown in FIG. 5, foam metal 20 having vacancies 21 can be used as the porous electric conductor. The single cell and the separator can come into contact with each other without damaging each other by using the foam metal. The material having the porosity ranging from 20 to 98% can be used as the foam metal.

Figure 6A:
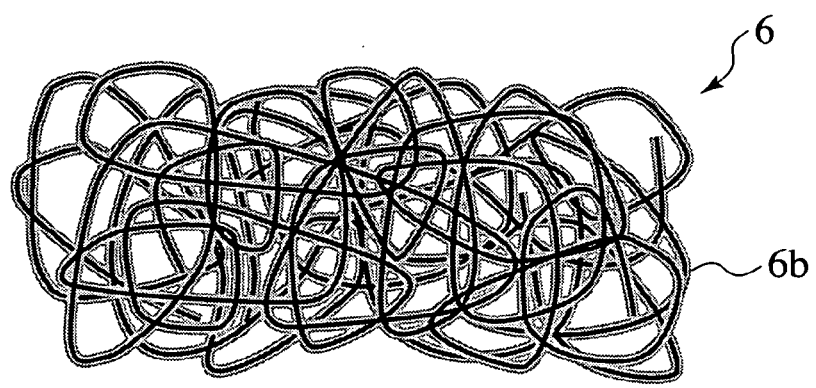
FIG. 6A is a schematic view showing a state in which the porous electric conductor is coated.
Figure 6B:
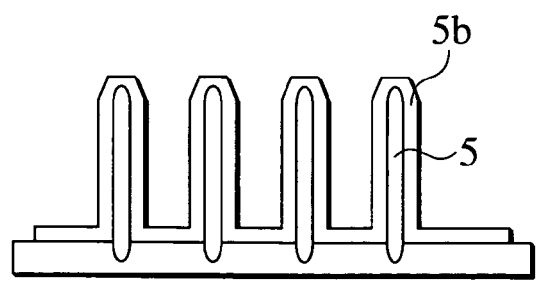
FIG. 6B is a schematic view showing a coated state of a separator on which the projections are provided.

As shown in FIGS. 6A and 6B, it is preferable that one of or both of the porous electric conductor 6 and the electrically conductive projection 5 are coated with the electrically conductive material having heat resistance and acid resistance. For example, alloys including the material constituting the porous electric conductor 6 and the projection 5, a material different from the material constituting the porous electric conductor 6 and the projection 5, electrically conductive ceramics, and the arbitrary combination of these materials can be used as a coating material (5b, 6b). Therefore, low cost can be realized, compared with when the projection or the collector is made of the noble metal. The contact resistance can be effectively reduced by performing the partial coating. The air electrode side can be coated with a perovskite type lanthanoid oxide or a composite material containing the perovskite type lanthanoid oxide. The both electrodes can be coated with the noble metal such as platinum (Pt) and palladium (Pd) or the alloy including the noble metals. The method of coating the electrode with the noble metal such as Pt or a compound of the noble metal by electroless plating, the method of providing the layer made of the noble metal or the perovskite type lanthanoid oxide by vacuum deposition such as sputtering, and the method of depositing the metal by the electrolytic plating can be cited as the typical coating method.

Ferritic stainless steel or the metals such as nickel (Ni), tungsten (W), chromium (Cr), aluminum (Al), molybdenum (Mo), tantalum (Ta), and vanadium (V) or the heat-resistant alloys including these metals, the noble metals such as platinum (Pt) and palladium (Pd) or the alloys including the noble metals, or the material in which the above-described heat-resistant alloys are coated with the noble metals can be used as the separator. These materials are difficult to form the oxide film on the surface in the high-temperature oxidation atmosphere, or these materials are effective in forming the electrically conductive oxide film in the high-temperature oxidation atmosphere.

The solid oxide fuel cell stack of the invention will be described in detail below.

The solid oxide fuel cell stack of the invention has the above-described fuel cell collector structure. The collector structure is adopted between single cells when the single cells are connected to perform stacking. The single cell is formed by sandwiching the solid electrolyte layer between the fuel electrode layer and the air electrode layer.

Even if strength of the single cell is small, the stacking can be realized by adopting the collector structure combining the porous electric conductor and the electrically conductive projection. The solid electrolyte layer can be designed to be thin, and the solid oxide fuel cell stack of the invention can realize the weight saving compared with the conventional fuel cell stack while the output is increased in each single cell. The collecting can be performed without strongly pressing the single cell by forming the collector structure on the surface of the electrode layer constituting each single cell. Namely, since the good electrical continuity can be obtained without burdening the single cell, contact failure can be prevented when the deformation is generated in the single cell.

Figure 7:
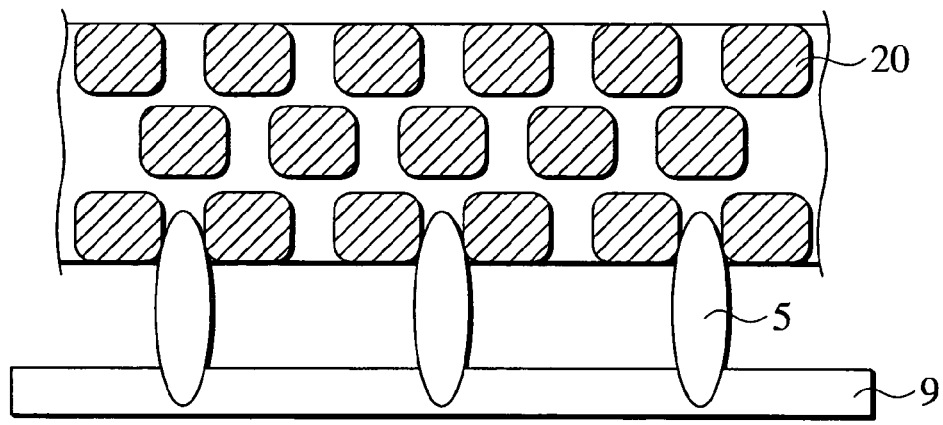
FIG. 7 is a schematic view showing a state in which only a leading end portion of the projection intrudes into an aperture of the porous collector.

The porous collector is not shifted in the plane direction in such a manner that the electrically conductive projection intrudes into the concave portion of the porous electric conductor, and the good conductivity is held by the electrical contact between the porous electric conductor and the electrically conductive projection. It is also possible that the projection having the needle-shaped tapered structure is combined with the porous collector having the average diameter of the aperture smaller than the sectional average diameter of the projection and only the leading end portion of the projection intrudes into the aperture portion of the porous collector to come into contact with the porous electric conductor. FIG. 7 shows an example of this mode. In FIG. 7, the projection 5 whose leading end portion is formed in the needle shape is provided on the separator 9. The foam metal 20 is used as the porous electric conductor. FIG. 7 shows the state in which the leading end portion of the projection 5 intrudes into the foam metal 20 to fix the separator and the foam metal to each other.

"Stack" means an element of electric power generation having a gas introducing mechanism. For example, the configuration shown in FIG. 8 can be cited. The fuel cell stack shown in FIG. 8 includes the single cell 1 having the air electrode layer 2, the fuel electrode layer 4, and the solid electrolyte layer 3, the collector 6 made of the metal thin wire, the separator 9 in which the electrically conductive projection 5 is provided, and a cell holding frame 10 in which a gas supply passage is provided. The collector 6 is provided in the stacking direction of the single cell 1, and the separator 9 is adjacent to the collector 6. The projection 5 intrudes into the collector 6, and the collector 6 and the separator 9 are fixed so as not to be moved in the plane direction. The cell holding frame 10 in which the gas supply passage is provided is provided in a peripheral portion of the collector 6, the air which is of an oxidizing agent gas is supplied to the air electrode side through the gas supply passage, and the hydrogen ($H_2$) which is of fuel gas is supplied to the fuel electrode side through the gas supply passage. It is preferable that the collector 6 located on the air electrode layer 2 side is coated with Pt. In the porous electric conductor, there is no limitation for the diameter of the aperture and the shape of the concave portion, as long as the porous electric conductor can exert permeability to the gas and gaseous diffusion characteristics.

The present invention will be described further in detail with examples and a comparative example. However, the invention is not limited thereto.

EXAMPLE 1

Figure 9B:
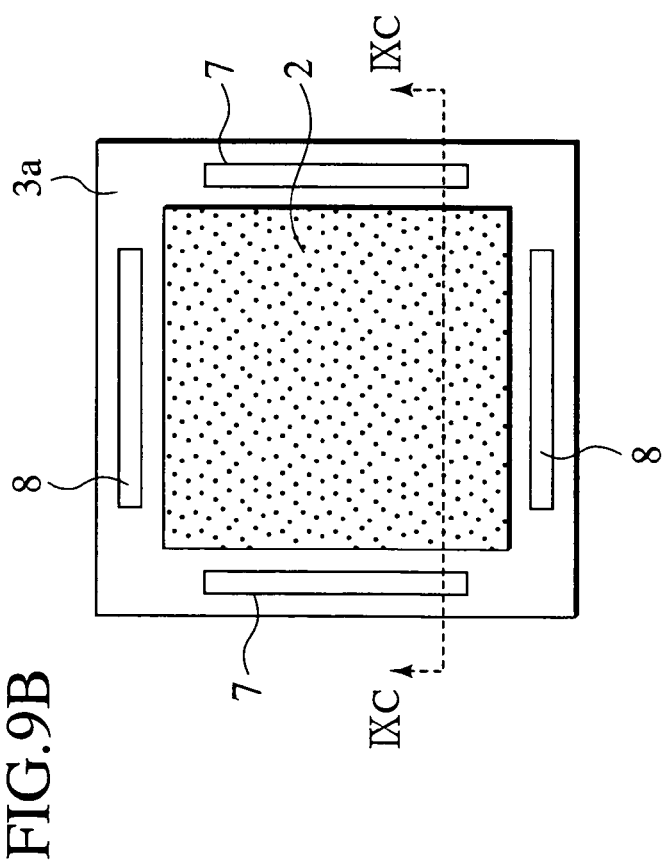
FIG. 9B is a plan view showing the single cell in the first example.
Figure 9C:
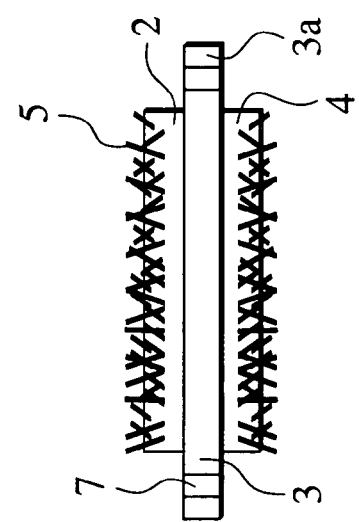
FIG. 9C is a cross-sectional view taken along the line IXC-IXC of FIG. 9B.

FIGS. 9A, 9B, and 9C show the single cell constituting the fuel cell collector structure of Example 1 and the collector arranged in the single cell. The cell shown in FIGS. 9A to 9C is an electrolyte support type in which the electrolyte layer is a support substrate.

The single cell 1 of Example 1 was formed by sandwiching the both surfaces of the electrolyte layer 3 between the air electrode layer 2 and the fuel electrode layer 4. The electrolyte layer 3 was made of 8 mol % yttria-stabilized zirconia (8YSZ) having the dimensions of about 12 cm square and the thickness of 100 μm. The electrolyte layer 3 included a support portion 3a in which a gas sealing portion and the gas passage were formed, while supporting the cell when the electrode was formed to be stacked with another single cell.

The air electrode layer 2 and the fuel electrode layer 4 had the dimensions of about 10 cm square, and the air electrode layer 2 and the fuel electrode layer 4 were baked in the thickness of about 100 μm. The fuel electrode layer 4 mainly contained NiO—YSZ, and the air electrode layer 2 mainly contained $La_{1-x}Sr_xMnO_3$ (LSM). About 5% Pt fiber was baked as an electrically conductive projection 5 on the surfaces of both the electrode layers at the same time when the electrode layer was formed. The Pt fiber has the excellent heat resistance, oxidizing atmosphere resistance, and reduction atmosphere resistance. In the needle-shaped electrically conductive projection 5, the diameter was about 50 μm, and the length ranged from about 2 mm to about 4 mm. It is desirable that the electrically conductive projection 5 has the plurality of inflections, a curled shape, or a spiral shape, the leading end portion differs from the base portion in the dimensions and the weight, and the projection 5 is easy to have the structure in which the projection is extended from the surface of the electrode layer.

In the single cell 1, the metal felt in which the heat-resistant metal fiber having tens of micrometers was woven was laminated as the collector 6 to realize the three-dimensional contact.

FIG. 10 shows a flow of producing the single cell 1.

At first, slurry of 8YSZ was used as the electrolyte material, a green sheet was produced by a doctor blade method, and piercing was performed through the green sheet to produce a temporal forming body of the electrolyte layer while the green sheet was cut out in predetermined dimensions (S1). The slurry of NiO—YSZ was used as the fuel electrode material, the 5% Pt fiber was added to the slurry of NiO—YSZ, the green sheet of the fuel electrode was produced by a slip casting method after stirring, and the green sheet was cut out in predetermined dimensions to produce the fuel electrode sheet (S2).

Then, the electrolyte and the fuel electrode sheet were laminated to each other, and sintering was performed by heat treatment at about 1400° C. to produce a semi-single cell (S3).

Further, the slurry of LSM was used as the air electrode material, the 5% Pt fiber was added to the slurry of LSM, and the air electrode sheet was produced in the same way as the fuel electrode sheet (S4).

Finally, the air electrode sheet was bonded to the semi-single cell, and the heat treatment was performed at about 1000° C. to complete the single cell (S5).

Figure 13A:
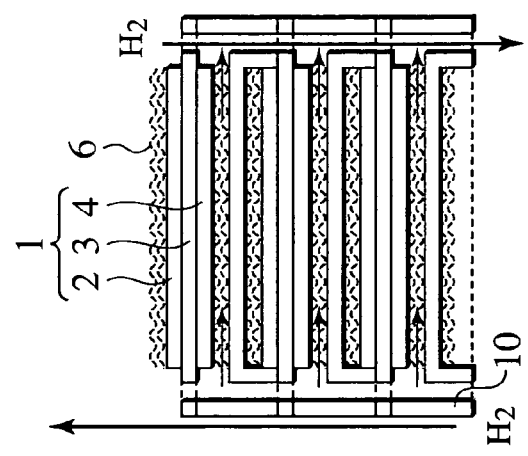
FIG. 13A is a cross-sectional view showing an air passage in the fuel cell stack of the first example.
Figure 13B:
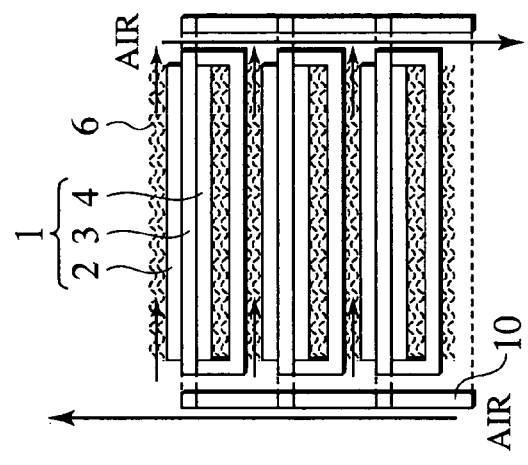
FIG. 13B is a cross-sectional view showing a fuel gas passage in the fuel cell stack of the first example.
Figure 12B:
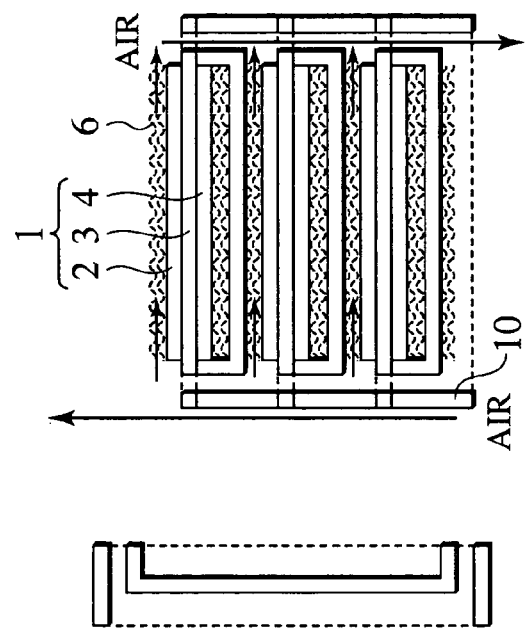
FIG. 12B is a cross-sectional view taken along the line XIIB-XIIB of FIG. 12A.
Figure 12A:
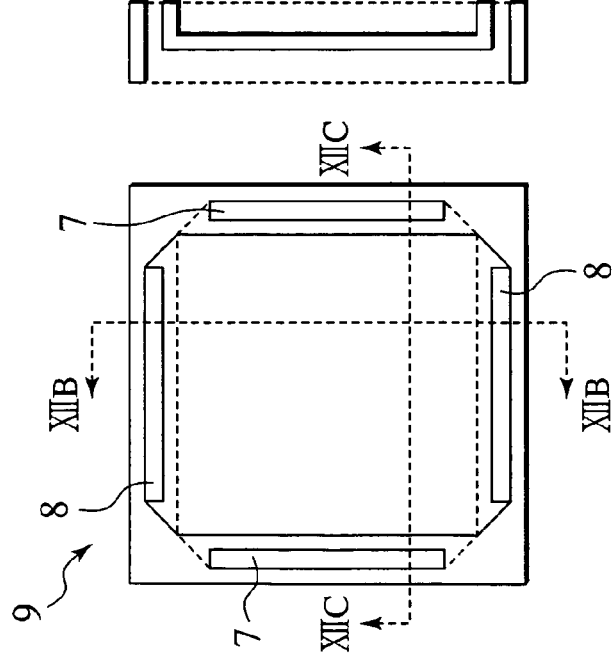
FIG. 12A is a plan view showing the separator in the first example.
Figure 12C:
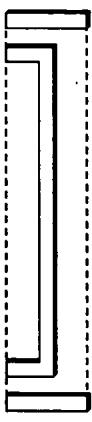
FIG. 12C is a cross-sectional view taken along the line XIIC-XIIC of FIG. 12A.

FIGS. 12A, 12B, and 12C show the separator 9 provided in the single cell 1 and the collector 6 shown in FIGS. 9A, 9B, and 9C. FIGS. 13A and 13B show the fuel cell stack having the collector structure using the single cell 1, the collector 6, the separator 9, and the cell holding frame 10 of Example 1.

The separator 9 is made of the heat-resistant metal. In the separator 9, the thickness is 4.5 mm, the air passage having depth of 2 mm is formed on one of the surfaces, the fuel passage having the depth of 2 mm is similarly formed on the other surface, and four manifolds 7 and 8 for gas supply and exhaust are formed in portions overlapping with the support portion 3a of the peripheral portion. The fuel cell stack is formed by alternately stacking the separators 9 and the single cells 1 through the collectors 6.

As shown in FIGS. 13A and 13B, air is supplied to the air electrode layer side and hydrogen is supplied to the fuel electrode layer side. The single cells 1 are connected in series through the collector structure and the separator 9.

In the metal felt used as the collector 6, while the tangle of the metal fiber is densified in the plane direction, the tangle of the metal fiber is roughened in the thickness direction. Therefore, the electrical resistance is small in the plane direction and the electrical resistance is large in the thickness direction in which the electric current is flown. However, since the metal fiber is inserted in the thickness direction in Example 1, the electrical resistance of the metal felt is decreased in the thickness direction.

Although the electrolyte support type cell was used in Example 1, the invention is not limited thereto. For example, as shown in FIG. 11, the invention can be also applied in the electrode support type. In this case, after the electrolyte layer 3 is provided and baked on the fuel electrode layer 4 by a screen printing method, the air electrode sheet including the Pt fiber produced by the slip casting method can be laminated and baked (S7 and S8). Further, although in Example 1, the electrode sheet in which the Pt fiber was mixed in electrode material was used, and the electrode sheet is bonding to the electrolyte layer. However, the invention is not limited to this producing method. For example, the method shown in FIGS. 14 and 15 can be used.

In the method shown in FIG. 14, after the Pt fiber was dispersed in the electrolyte layer 3, the slurry of the fuel electrode material was applied, and the drying and the baking were performed (S9). Then, the Pt fiber was also dispersed in the air electrode side, the slurry of the air electrode material was applied, and the drying and the baking were performed (S10). At the step S9, it is also possible that the screen printing of the slurry of the fuel electrode material is performed on the electrolyte layer 3, the Pt fiber is dispersed after the drying, and the drying and the baking are performed after applying the slurry of the fuel electrode material again. Similarly, at the step S10, it is also possible that the screen printing of the slurry of the air electrode material is performed on the electrolyte layer 3 on which the fuel electrode layer 4 is provided, the Pt fiber is dispersed after the drying, and the drying and the baking are performed after applying the slurry of the fuel electrode material again.

In the method shown in FIG. 15, the screen printing of the slurry of the electrolyte material was performed on the fuel electrode layer 4 which is of the substrate, and the drying and the baking were performed (S11). Then, the Pt fiber was dispersed on the electrolyte layer 3, and the slurry of the air electrode material was applied, and the drying and the baking were performed (S12). At the step S12, it is possible that the screen printing of the slurry of the air electrode material is performed on the electrolyte layer 3, the Pt fiber is dispersed after the drying, and the drying and the baking are performed after applying the slurry of the fuel electrode material again.

EXAMPLE 2

Figure 8:
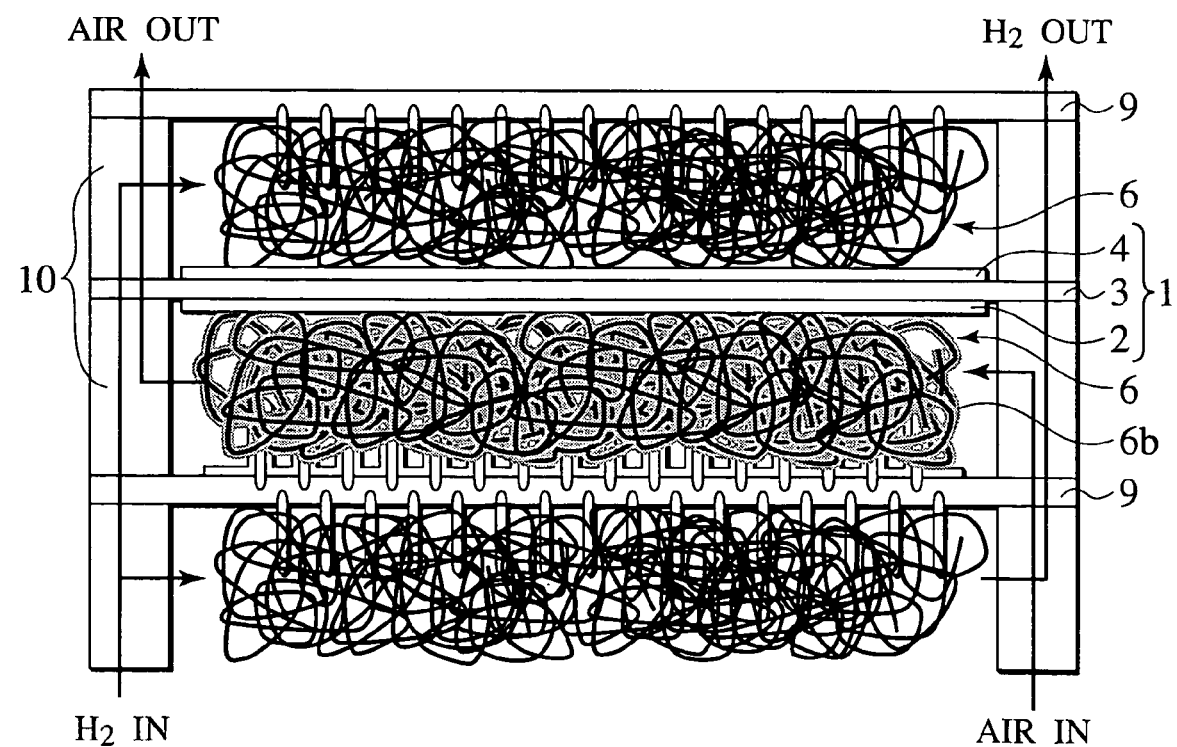
FIG. 8 is a schematic view showing an example of a solid electrolyte fuel cell stack of the invention.

The fuel cell stack having the structure shown in FIG. 8 was produced and variation of the output was measured. The single cell 1 used in Example 2 was one in which the fuel electrode layer 4 made of NiO-8YSZ having the dimensions of 10 cm square and the thickness of 10 μm and the air electrode layer 2 made of $La_{0.8}Sr_{0.2}MnO_3$ having the dimensions of 10 cm square and the thickness of 10 μm were provided on the electrolyte plate made of 8YSZ having the dimensions of 12 cm square and the thickness of 50 μm.

About 5% Pt fiber having the excellent heat resistance, oxidizing atmosphere resistance, and reduction atmosphere resistance was baked as the electrically conductive projection 5 on the surfaces of both the electrodes at the same time when the electrode layer was formed.

The metal felt made of the Ni metal thin wire having the diameter of 20 μm was used as the collector 6 on the fuel electrode layer 4 side. Further, the porous electric conductor made of the metal thin wire in which the surface of stainless steel (SUS316) having the same shape as the Ni metal thin wire was coated by the Pt plating was used as the collector 6 on the air electrode layer 2 side.

A grater-shaped stainless steel substrate in which the projections 5 having the length of 1000 μm and the average diameter of 100 μm were formed on both the surfaces of the substrate was used as the separator 9.

Figure 16:
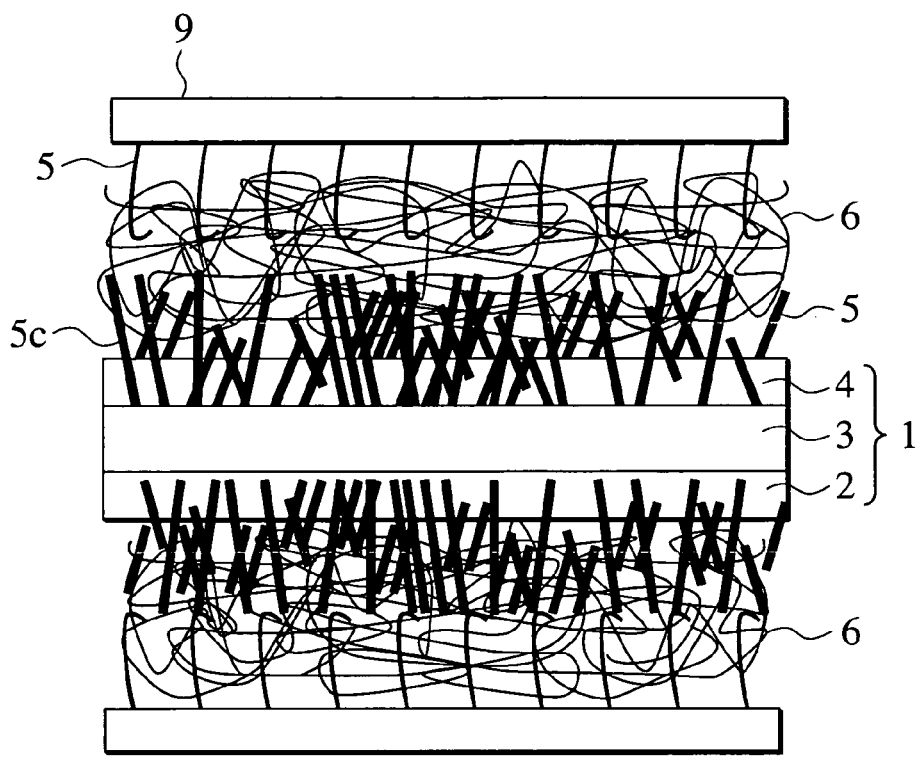
FIG. 16 is a schematic view showing a collector structure of a second example.

The single cell 1, the collector 6, the separator 9, and the cell supporting frame 10 were laminated to produce the stack including 20 single cells 1 as shown in FIG. 8. FIG. 16 shows the enlarged view of the collector structure of Example 2.

The variation of the output electrically generated at 700° C. was measured by introducing hydrogen into the fuel electrode layer side and introducing air into the air electrode layer side. The output was 200 W at the beginning of the evaluation, the output was 193 W after a lapse of 1000 hours, and the output was 188 W after the lapse of 2000 hours. As described above, the fuel cell stack having the collector structure of Example 2 has the excellent electrical continuity because the electrically conductive projections are three-dimensionally in contact with the porous electric conductor. In the fuel cell stack, margins for the densification and the shape are also improved. Further, the electrical resistance of the collector is improved in the longitudinal direction.

EXAMPLE 3

Figure 17:
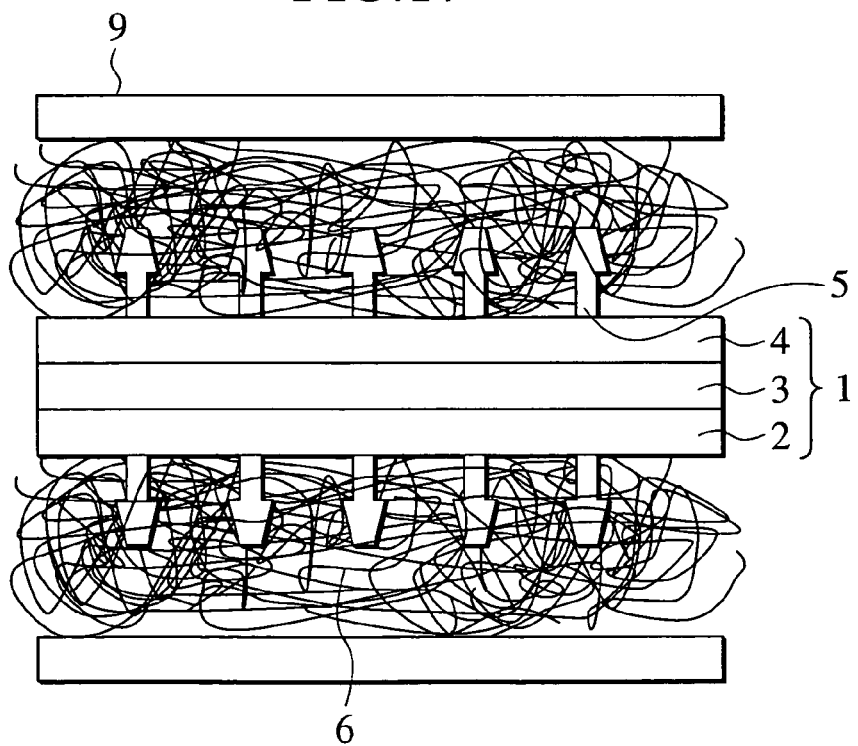
FIG. 17 is a schematic view showing a collector structure of a third example.

The collector structure of Example 3 was obtained by repeating the same procedure as Example 1 except that the electrically conductive projections 5 on the single cell 1 were formed by the plating. FIG. 17 shows the enlarged view of the collector structure, and FIGS. 18A to 18D show the process of producing the collector structure.

As shown in FIG. 18A, the fuel electrode layer and the air electrode layer were respectively baked on the surfaces of the electrolyte layer made of 8YSZ to produce the single cell 1.

As shown in FIG. 18B, after the electrically conductive material such as Pt was deposited on both the surfaces of the single cell 1 with the thickness of about 100 nm, both the surfaces were coated with resist films 12, and the aperture portions in which a Pt layer is exposed at the predetermined position were formed by a photolithographic technology.

As shown in FIG. 18C, the electrically conductive projections 5 made of Pt were formed on the surfaces of the electrodes by the electrolytic plating. As shown in FIG. 18D, the resist film 12 was removed by chemical processing.

In addition to the effect of the collector structure of Example 1, the collector structure of Example 3 can form the electrically conductive projections by the additional processing after the production of the single cell and utilize the same process of producing the single cell. Further, the leading end portion of the electrically conductive projection can be increased in the dimensions by adjusting a plating time, which allows the projection to have the shape difficult to disengage from the collector.

EXAMPLE 4

Figure 19A:
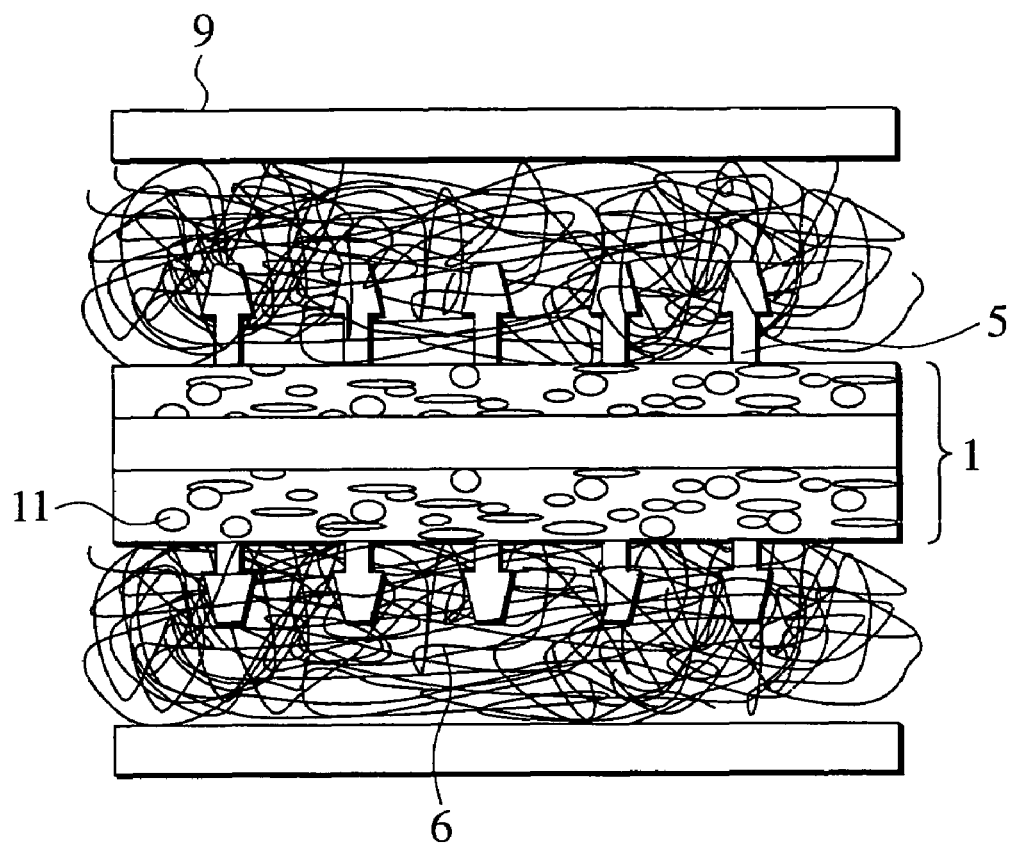
FIG. 19A is a schematic view showing a collector structure of a fourth example.
Figure 19B:
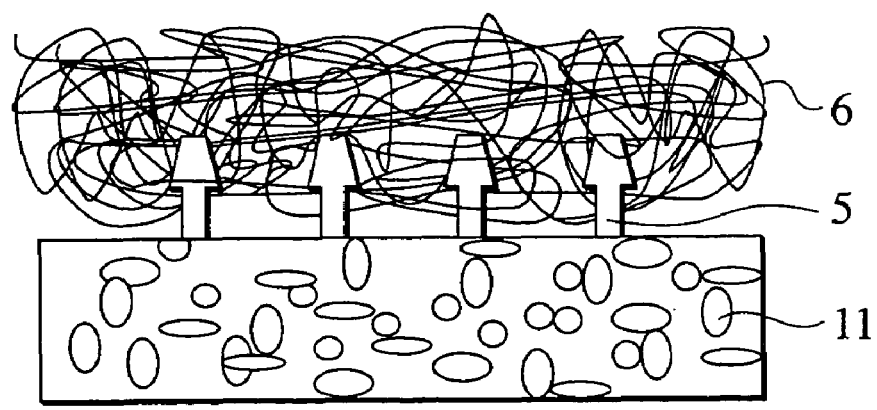
FIG. 19B is a schematic view showing the single cell and the collector in the fourth example.

As shown in FIGS. 19A and 19B, the collector structure of Example 4 was obtained by repeating the same procedure as Example 3 except that fillers 11 made of the heat-resistant metal were embedded in the electrode layer of the single cell. Specifically, in the collector structure of Example 4, when the electrode layer was formed on the electrolyte layer, the fillers made of the metal fiber having the average diameter ranging from hundreds of nanometers to tens of micrometers were mixed in the electrode material to bake the single cell.

In the collector structure of Example 4, since the metal fillers were embedded in the electrode layer, adhesion of the electrically conductive projection 5 formed by the plating to the electrode layer was further strengthened, and the conductivity of the electrode layer was further enhanced.

EXAMPLE 5

Figure 20:
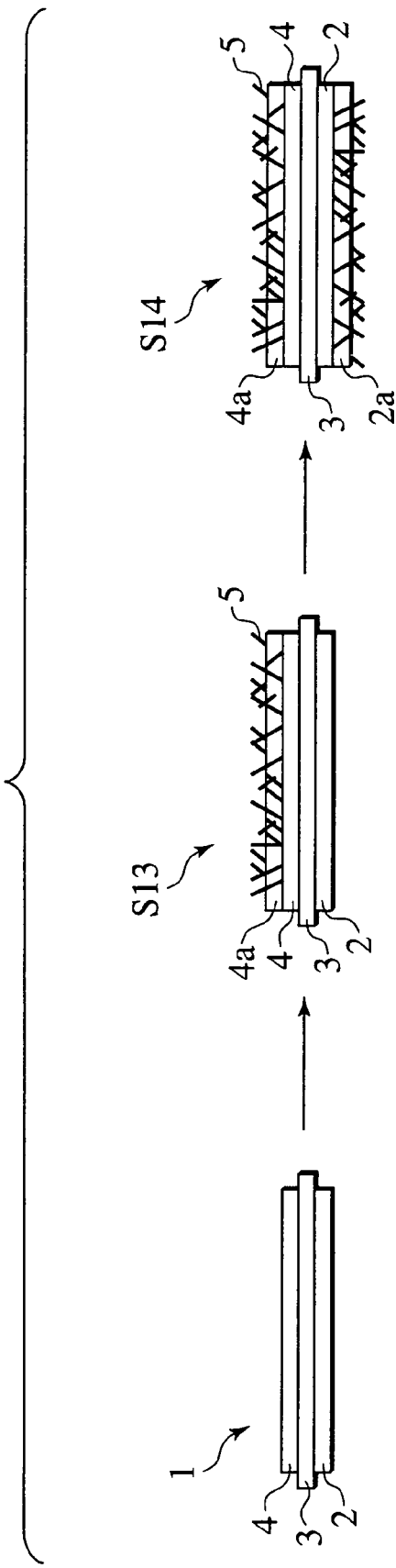
FIG. 20 is a schematic view showing a process of producing a single cell in a fifth example.

The collector structure of Example 5 was obtained by repeating the same procedure as Example 1 except that each electrode was formed by a multi-layered structure in the single cell. FIG. 20 shows the process of producing the collector structure of Example 5.

At first, the single cell 1 was produced by the method in Example 3. The slurry made of the electrically conductive material including the metal fiber was applied on the fuel electrode layer 4 by the slip casting method, and then the drying and the baking of the single cell 1 on which the slurry was applied were performed (S13). Then, the slurry made of the electrically conductive material including the metal fiber was applied on the air electrode layer 2 by the slip casting method, and then the drying and the baking of the single cell 1 on which the slurry was applied were performed (S14). Thus, the single cell in which a second fuel electrode layer 4a and a second air electrode layer 2a having the electrically conductive projections 5 were provided could be obtained. At the steps S13 and S14, it is also possible that the metal fibers are dispersed on each electrode layer, the slurry made of the electrically conductive material is applied, and then the drying and the baking are performed. Further, at each of the steps S13 and S14, although the baking was performed after drying the slurry, it is possible that the second fuel electrode layer 4a and the second air electrode layer 2a are simultaneously baked.

Generally, the fuel electrode is formed at the high-temperature baking process as high as 1400° C. and the air electrode is formed at the high-temperature baking process as high as 1000° C. Therefore, it was naturally necessary that the electrically conductive material has the heat resistance of the extent that the electrical conductivity is not lost at the above-described temperatures.

According to Example 5, since the process of baking the electrode is different from the method of forming the electrically conductive projection, the extent of the operating temperature of SOFC is sufficient for the heat resistance of the material constituting the electrically conductive projection, and the more electrically conductive materials are applicable to the projection material. Further, as long as the second electrode layer has the electrical conductivity and the permeability to gases, catalysis is not particularly required for the second electrode layer, so that the second electrode layer can be produced from metal paste having the heat resistance to the extent of the operating temperature of SOFC or the electrically conductive material paste using zinc oxide or tin oxide.

COMPARATIVE EXAMPLE

The single cell used in Comparative Example was one in which the fuel electrode layer made of NiO-8YSZ having the dimensions of 10 cm square and the thickness of 10 µm and the air electrode layer made of $La_{0.8}Sr_{0.2}MnO_3$ having the dimensions of 10 cm square and the thickness of 10 µm were provided on the electrolyte plate made of 8YSZ having the dimensions of 12 cm square and the thickness of 50 µm.

The porous electric conductor made of the Ni metal thin wire having the diameter of 20 µm was used as the collector on the fuel electrode layer side, and the porous electric conductor made of the metal thin wire in which the surface of stainless steel (SUS316) having the same shape as the Ni metal thin wire was coated by the Pt plating was used as the collector on the air electrode layer side. The stainless steel (SUS316) plate was used as the separator and the collector between the collector on the fuel electrode layer side and the air electrode layer side. The single cell, the collector, and the separator were laminated to produce the stack including 20 single cells. The stack of Comparative Example was one in which the electrically conductive projections 5 were excluded from the stack of Example 2.

The variation of the output electrically generated at 700° C. was measured by introducing hydrogen into the fuel electrode layer side and introducing air into the air electrode layer side. The output was 198 W at the beginning of the evaluation, the output was 157 W after a lapse of 1000 hours, and the output was 123 W after the lapse of 2000 hours.

The entire contents of Japanese Patent Applications No. P2003-200833 with a filing date of Jul. 24, 2003 and No. P2003-419676 with a filing date of Dec. 17, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A fuel cell collector structure, comprising:
    a single cell which is formed by sandwiching a plate-shaped solid electrolyte between a fuel electrode and an air electrode;
    a collector which is provided adjacent to the single cell; and
    a separator which is provided adjacent to the collector,
    wherein the collector is made of a porous electric conductor having a plurality of apertures on a surface of the collector,
    the single cell and/or the separator has a plurality of electrically conductive projections on a respective surface of the single cell and/or the separator, and
    the projections intrude into the apertures to come into contact with the collector.

2. A fuel cell collector structure according to claim 1, wherein a sectional average diameter of the projections is smaller than an average diameter of the apertures.

3. A fuel cell collector structure according to claim 1, wherein the projections are needle-shaped or columnar.

4. A fuel cell collector structure according to claim 1, wherein a leading end portion of the projections are thicker than a portion of the projections which are adjacent to the single cell or the separator.

5. A fuel cell collector structure according to claim 1, wherein the projections have at least one inflection point.

6. A fuel cell collector structure according to claim 1, wherein the projections are formed by simultaneously baking an electrically conductive projection material and an electrode material.

7. A fuel cell collector structure according to claim 1, wherein the projections are formed by plating.

8. A fuel cell collector structure according to claim 1, wherein the porous electric conductor is made of a metal thin wire.

9. A fuel cell collector structure according to claim 1, wherein the porous electric conductor is formed by performing mix spinning of a plurality of metal thin wires made of different metals.

10. A fuel cell collector structure according to claim 1, wherein the porous electric conductor is formed by joining a plurality of metal thin wires made of different metals.

11. A fuel cell collector structure according to claim 1, wherein the porous electric conductor is made of foam metal.

12. A fuel cell collector structure according to claim 1, wherein the porous electric conductor and/or the projections are coated with at least one material selected from the group consisting of an alloy including a material forming the porous electric conductor or the projections, a material different from the material forming the porous electric conductor or the projections, and electrically conductive ceramics.

13. A solid oxide fuel cell stack, comprising:

a fuel cell collector structure including a single cell which is formed by sandwiching a plate-shaped solid electrolyte between a fuel electrode and an air electrode, a collector which is provided adjacent to the single cell, and a separator which is provided adjacent to the collector, wherein the collector is made of a porous electric conductor having a plurality of apertures on a surface of the collector, the single cell and/or the separator has a plurality of electrically conductive projections on a respective surface of the single cell and/or the separator, and the projections intrude into the apertures to come into contact with the collector.

* * * * *